(12) United States Patent
Dumortier (10) Patent No.: US 9,002,325 B2
(45) Date of Patent: Apr. 7, 2015

(54) METHOD OF COMMUNICATING BETWEEN DIFFERENT ELECTRONIC ENTITIES

(75) Inventor: Gilles Dumortier, Rueil Malmaison (FR)

(73) Assignee: Oberthur Technologies, Colombes (FR)

( * ) Notice: Subject to any disclaimer, the term of this patent is extended or adjusted under 35 U.S.C. 154(b) by 0 days.

(21) Appl. No.: 10/550,011

(22) PCT Filed: Mar. 9, 2004

(86) PCT No.: PCT/FR2004/000556
§ 371 (c)(1),
(2), (4) Date: Jan. 23, 2006

(87) PCT Pub. No.: WO2004/088569
PCT Pub. Date: Oct. 14, 2004

(65) Prior Publication Data
US 2006/0226954 A1    Oct. 12, 2006

(30) Foreign Application Priority Data
Mar. 17, 2003  (FR) ...................... 03 03241

(51) Int. Cl.
 H04L 12/58    (2006.01)
 H04M 1/725    (2006.01)
 G06K 7/10    (2006.01)
 G06K 7/00    (2006.01)

(52) U.S. Cl.
 CPC .......... G06K 7/10128 (2013.01); G06K 7/0008 (2013.01)

(58) Field of Classification Search
 CPC ............................ H04W 16/14; H04B 5/0031
 USPC .......................................................... 455/421
 See application file for complete search history.

(56) References Cited

U.S. PATENT DOCUMENTS

| | | | |
|---|---|---|---|
| 5,973,613 A | 10/1999 | Verma et al. | |
| 6,216,001 B1 * | 4/2001 | Ghirnikar et al. | .......... 455/435.1 |
| 6,367,702 B1 | 4/2002 | Dietrich et al. | |
| 6,513,015 B2 | 1/2003 | Ogasawara | |

(Continued)

FOREIGN PATENT DOCUMENTS

| | | |
|---|---|---|
| DE | 195 08 722 | 9/1996 |
| EP | 0 851 239 | 7/1998 |

(Continued)

OTHER PUBLICATIONS

Aono, H., et al, "Security Transferable Entity Platform for Mobile Communications", Joho Shori Gakkai Kenkyu Hokoku, Dec. 20, 2002, pp. 67-72, vol. 2002, No. 122, Published in JP; English abstract included.

(Continued)

Primary Examiner — Ankur Jain
(74) Attorney, Agent, or Firm — Young & Thompson (57) ABSTRACT

A method of communicating between at least two electronic entities (121, 122, 123), involves a communication management unit (10) which uses a command/response protocol in order to communicate with the electronic entities (121, 122, 123). At least one of the aforementioned electronic entities (121, 122) communicates with the communication management unit (10) using wireless technology. The communication method includes a step consisting in saving a list of electronic entities in the communication management unit (10). The method can be used for microcircuit cards.

17 Claims, 3 Drawing Sheets

(56) References Cited

U.S. PATENT DOCUMENTS

| | | | |
|---|---|---|---|
| 6,665,521 B1 * | 12/2003 | Gorday et al. | 455/67.11 |
| 6,865,401 B2 * | 3/2005 | Kotzin | 455/557 |
| 2001/0027111 A1 | 10/2001 | Motegi et al. | |
| 2002/0014529 A1 | 2/2002 | Tanaka | |
| 2002/0065711 A1 | 5/2002 | Fujisawa et al. | |
| 2003/0124978 A1 * | 7/2003 | Virtanen | 455/41 |

FOREIGN PATENT DOCUMENTS

| | | |
|---|---|---|
| EP | 1331760 | 7/2003 |
| JP | 11008874 | 1/1999 |
| JP | 2000099827 | 4/2000 |
| JP | 2001346267 | 12/2001 |
| JP | 2002024778 | 1/2002 |
| JP | 2002024946 | 1/2002 |
| JP | 2002063334 | 2/2002 |
| JP | 2002141903 | 5/2002 |
| JP | 2002304507 | 10/2002 |
| JP | 2002366906 | 12/2002 |
| JP | 2003032751 | 1/2003 |
| JP | 2003507805 | 2/2003 |
| WO | 0113656 | 2/2001 |
| WO | WO 01/31600 | 5/2001 |
| WO | 0148977 A2 | 7/2001 |
| WO | WO 01/65467 | 9/2001 |
| WO | 0225984 | 3/2002 |

OTHER PUBLICATIONS

Translation of Japanese Office Action, dated Apr. 16, 2013, from corresponding JP application.

\* cited by examiner

METHOD OF COMMUNICATING BETWEEN DIFFERENT ELECTRONIC ENTITIES

SUMMARY OF THE INVETION

The invention relates to a method of communicating between different electronic entities.

It applies to communication systems that use a communication protocol of the command-response type. In systems of this type, a communication management unit controls at least part of the process of communication between a set of electronic entities by sending commands to each of the electronic entities of this set which, after processing these commands they receive, which may entail complex calculations, merely respond to those commands.

The communication management unit may be a terminal, for example, which may form part of the set of communicating electronic entities. This is the case with bank cards and payment terminals used at present, for example. The terminal executes a program for controlling the process of communication between itself and the microcircuit bank card.

It is estimated that over the next two to three years there will emerge a requirement for applications enabling communication between a plurality of electronic entities, in particular secure portable entities. By then robust and dynamic communication mechanisms will be needed. For example, electronic entities may frequently and without warning find themselves out of communication range. The problem of the potential loss of messages being broadcast may then arise.

An object of the present invention is to solve this problem.

To this end, the invention proposes a method of communication between at least two electronic entities, said method involving a communication management unit that employs a command-response protocol to communicate with said electronic entities, this method being remarkable in that at least one of said electronic entities communicates with the communication management unit using a wireless technology and in that it includes a step consisting in storing a list of said electronic entities in the communication management unit.

The above method, which is particularly suitable for a command-response protocol, thus authorizes the intermittent presence of one or more electronic entities within the radius of action of the communication management unit without loss of messages being broadcast, given that only the messages to be sent or to be received by the electronic entities contained in the list stored in the communication management unit will be processed. The expression "radius of action" means the region within which communication is possible between the communication management unit and the electronic entities. One non-limiting example of a radius of action is a radio-frequency field. By extension, the radius of action also includes cable connections between the communication management unit and certain electronic entities.

The communication management unit is referred to as a logical processing unit (LPU) in the context of application of the invention to microcircuit cards using a contactless communication technology. The invention is particularly suited to electronic entities of this kind. In this application, an LPU communicates with contactless microcircuit cards within its radio-frequency field. This is because the LPU is provided with a contactless reader whose structure is known in the art but which is used in an unconventional way, in an environment with a plurality of microcircuits. It is used unconventionally in the sense that it provides communication between the different electronic entities that are simultaneously within the field of the LPU, in contrast to the standard situation in which, if a plurality of microcircuits are within the field of the LPU, a single one of them is selected to communicate with the LPU. The LPU may be a simple standard personal computer (PC).

The electronic entities of a set E controlled by the LPU communicate with the latter by radio frequency using a capacitive or inductive coupling mechanism defined in the ISO/IEC 14443, 15693 or 18000 standards. The 14443 standard applies to identification cards known as proximity cards (approximately 10 cm range): "Identification Cards—Contactless integrated circuit(s) cards—Proximity cards". The 15693 standard applies to identification cards known as vicinity cards (approximately 70 cm range): "Identification Cards—Contactless integrated circuit(s) cards—Vicinity cards". The draft 18000 standard applies to radio-frequency communication identity tags and to different frequencies (125 kHz, 13.56 MHz, 443 MHz, 900 MHz, etc.).

Radio-frequency applications (WiFi, BlueTooth, etc.) are not targeted by the invention a priori. The invention could nevertheless apply to them in a command-response communication scheme using a communication management unit. The invention may equally be applied to communications involving contact, for example using a microcircuit card to the ISO 7816 standard.

Generally, but not necessarily, the LPU supplies energy to the communicating entities.

According to one particular feature, the electronic entities constitute a network of acquaintances, i.e. a list of entities in the radius of action of the communication management unit and able to communicate with each other.

This network of acquaintances has the advantage of being dynamic. When the system is started up it may be either empty or preprogrammed to contain one or more electronic entities.

According to one particular feature, the method includes a step of adding a new electronic entity to the network of acquaintances as a function of at least one predetermined criterion if the list of entities stored in the communication management unit includes that new electronic entity.

Accordingly, if a new electronic entity E enters into communication with the communication management unit, either by connecting physically to it or by entering its radius of action, that entity E is added to the network of acquaintances, and is stored therein as an acquaintance of an entity P already in the network if and only if P and E communicate with each other subsequently. A criterion C may be used to determine this acquaintanceship, for example the nature of the entity. The criterion C depends primarily on the application. The network of acquaintances may contain only two entities, or be reduced to a simple list if all the entities in the radius of action of the communication management unit are able to communicate with each other.

According to one particular feature, the communication method of the invention includes a step of storing a message intended for at least one of said at least two electronic entities if the addressee electronic entity is temporarily out of range of the communication management unit.

This avoids the loss of messages if an entity temporarily leaves the radius of action of the communication management unit. As indicated above, the intermittent presence of an electronic entity in the radius of action of the communication management unit is therefore possible.

According to one particular feature, a unique identifier is associated with each of said at least two electronic entities.

This constitutes a simple means of designating and identifying each electronic entity. If the electronic entities are microcircuit cards, the 7816-6/AM1 standard specifies a fabricator identifier and the construction of a unique identifier for each microcircuit.

According to one particular feature, each identifier is associated with a service code or application family code (as defined in the ISO 14443 standard).

This enables the electronic entities to be classified according to their nature and their application so that their designation and their identification may be specified.

According to one particular feature, the communication method includes a step of creating a mailbox in the communication management unit when the list of entities that is stored therein includes a new electronic entity, this mailbox being adapted to receive and store messages sent to or sent by the new electronic entity.

Messages awaiting processing are thus saved in this mailbox.

One particular embodiment of the method includes steps in which the communication management unit:
  scans the list of electronic entities,
  asks each electronic entity if it has a message to send, and if so:
  stores this message in a mailbox,
  sends the message to the electronic entity that is the addressee of the message when it can be contacted, and then:
  eliminates the message from the mailbox.

Thus the list and the mailbox enable simple and effective management of messages by the communication management unit.

This mailbox is an inbox, for example, i.e. it may contain messages waiting to be sent to the associated entity.

This is the most common situation.

One particular embodiment of the communication method involves at least three electronic entities and combines the communication management unit with one of the electronic entities.

The communication management unit is therefore referred to as a "participant" in that it participates in the exchange of messages with the other electronic entities.

According to one particular feature, the communication management unit serves as a proxy, i.e. an intermediary, for accessing at least one of the electronic entities.

This supplementary function of the communication management unit is practical and simple to implement.

According to one particular feature, the method includes a step of assigning a time to live to each message awaiting reception by an addressee electronic entity.

This enables messages whose addressee has been out of contact for a long time to be eliminated. Depending on the requirements of the application, this time to live may be set to a special value (for example 0) to eliminate messages as soon as it is detected that their addressee is out of range of the communication management unit.

According to one particular feature, the method includes a step of assigning a priority to each message exchanged in the context of the command-response protocol.

This enables the communication mechanism to process priority messages first.

The communication method of the present invention is adapted to broadcast a message from one of the at least two electronic entities to all the other electronic entities.

This enables the provision of call offering mechanisms, for example, whereby an entity requiring a particular service sends a broadcast message of this kind to all the known entities of the system in order to receive one or more proposals for the provision of this service.

In one particular embodiment, at least one of the electronic entities is portable.

Thus all the practical advantages of portability are available.

In one particular embodiment, at least one of the electronic entities communicates with the communication management unit using a contactless technology.

This enables numerous applications. The electronic entity may dispense with batteries and may therefore be implemented in a very compact form.

In a particular embodiment, at least one of the electronic entities is secure.

The invention therefore finds a special application to communication between different secure electronic entities.

At least one of the electronic entities may be a contactless microcircuit card, such as a contactless bank card, a contactless access control card, or a contactless identity card. These examples are not limiting on the invention.

More generally, at least one of the electronic entities may be a loyalty card or a payment card.

In one particular embodiment, the method of the invention ensures continuity of communication involving one of the electronic entities and an antenna from a plurality of antennas connected to the communication management unit when that electronic entity is moving in such a manner that the aforementioned communication involves another antenna from the plurality of antennas mentioned above.

In one special application of the present invention, the electronic entities participate in a process of personalizing a contactless object and the process includes at least one step of mutual authentication of the electronic entities, reciprocal or otherwise.

This in particular enables verification that all the electronic entities participating in the personalization process are authorized to do so.

In one particular embodiment of this application, the personalization process includes passing the object to be personalized in front of a plurality of stations each including wireless communication means connected to the communication management unit and the method ensures continuity of the personalization process when the object passes from one station to the next.

In the same embodiment of the same application, the object may communicate with the plurality of stations using a contactless technology.

This technology is particularly adapted to travel documents and official documents, which increasingly, in their electronic version, use this technology for practical reasons. For example, a passport may retain its original format with a microcircuit inserted into the paper of the passport using the contactless communication technology.

The present invention enables easy and robust Java Remote Method Invocation (RMI) communication between the different electronic entities of the system.

BRIEF DECRIPTION OF THE DRAWINGS

Other aspects and advantages of the invention will become apparent on reading the following detailed description of particular embodiments of the invention, which are provided by way of nonlimiting example. The description is given with reference to the accompanying drawings, in which.

DETAILED DESCRIPTION OF THE PREFERRED EMBODIMENTS

Figure 1:
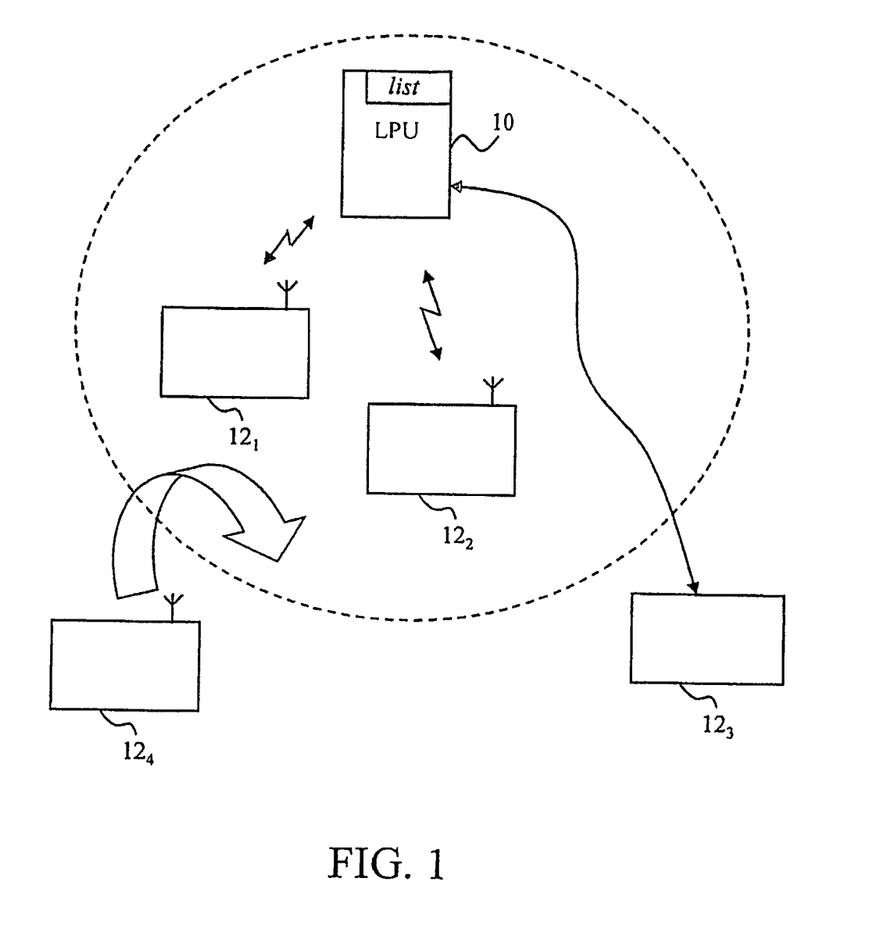
FIG. 1 is a diagram of a communication management unit and different electronic entities using the present invention.

As shown in FIG. 1, one particular embodiment of the communication method of the present invention uses a logical processing unit (LPU) 10 that functions as a communication management unit using a command-response communication protocol and therefore controls at least part of the process of communication between a plurality of electronic entities $12_1$, $12_2$, $12_3$.

Here the electronic entities $12_1$ and $12_2$ are microcircuit cards each provided with an antenna and communicating with the LPU 10 using a contactless technology and the electronic entity $12_3$ is a secure hardware module (SHM) and communicates with the LPU 10 via a cable connection. However, more generally, the electronic entities $12_1$ and $12_2$ may communicate with the LPU 10 using a wireless technology conforming to the BlueTooth, WiFi, etc. standards. The radius of action of the LPU 10 is represented in dashed lines in the drawing and here corresponds to the region subjected to a radio-frequency field.

The communication method of the present invention includes a step of storing in the LPU 10 a list of the electronic entities that are able to communicate with it (labeled "list" in the drawing).

The electronic entities $12_1$, $12_2$ and $12_3$ form a network of acquaintances, i.e. they are able to exchange messages.

As described in the introduction, this network of acquaintances is dynamic in the sense that it evolves as a function of the arrival of one or more new electronic entities in the radius of action of the LPU 10 or, conversely, upon the departure of one or more electronic entities from that radius of action.

Accordingly, when the electronic entity $12_4$, which here is a contactless microcircuit card (but could equally well communicate with the LPU using a wireless technology conforming to the BlueTooth, WiFi, etc. standards), enters into communication with the LPU 10, on arriving in its radio-frequency field, not only is that entity added to the list stored in the LPU 10 but also the new entity $12_4$ is registered as an acquaintance of the entity $12_1$ if and only if both these entities communicate with each other subsequently and, similarly, the new entity $12_4$ is registered as an acquaintance of the entity $12_2$ if and only if these two entities communicate with each other subsequently and the new entity $12_4$ is registered as an acquaintance of the entity $12_3$ if and only if these two entities communicate with each other subsequently. For determining these acquaintances, a criterion C may be used such as two entities of the same type being able to communicate with each other, for example.

Moreover, for each of the entities $12_1$, $12_2$ and $12_3$ in the system the LPU 10 manages a mailbox that stores messages awaiting processing. For example, if the electronic entity $12_2$ temporarily leaves the radio-frequency field and the LPU 10 then receives a message for the entity $12_2$, that message is stored in the mailbox assigned to the entity $12_2$ until the entity $12_2$ returns to the radio-frequency field. Similarly, if the entity $12_3$ disconnects temporarily from the LPU 10 and the LPU 10 then receives a message for the entity $12_3$, that message is stored in the mailbox assigned to the entity $12_3$ until the entity $12_3$ reconnects to the LPU 10.

When the new entity $12_4$ enters the network, a mailbox is created in the LPU for that entity and contains messages awaiting processing by the new entity $12_4$.

An electronic entity is eliminated from the network if it leaves the radio-frequency field or is physically disconnected from the LPU 10, and if its mailbox is empty and none of its acquaintances has a message for it.

Each electronic entity is identified by a unique identifier. Typically the identifier described in Part 3 of the ISO 14443 standard or in the ISO 7816-6/AM1 standard is chosen. This identifier is advantageously associated with a service or family code describing the options supported by the entity and forming part of the criterion C of acquaintanceship between entities.

Accordingly, if the entity $12_1$ wishes to send a message to the entity $12_2$, it can do so by indicating the identifier of the entity $12_2$ or by specifying only the service or family code of the entity $12_2$. In this case, the LPU 10 always chooses the same addressee for the same service or family code from one message to another. Alternatively, and depending on the nature of the application, any deterministic or non-deterministic method may be used to choose the addressee of a message by means of its service or family code.

Figure 2:
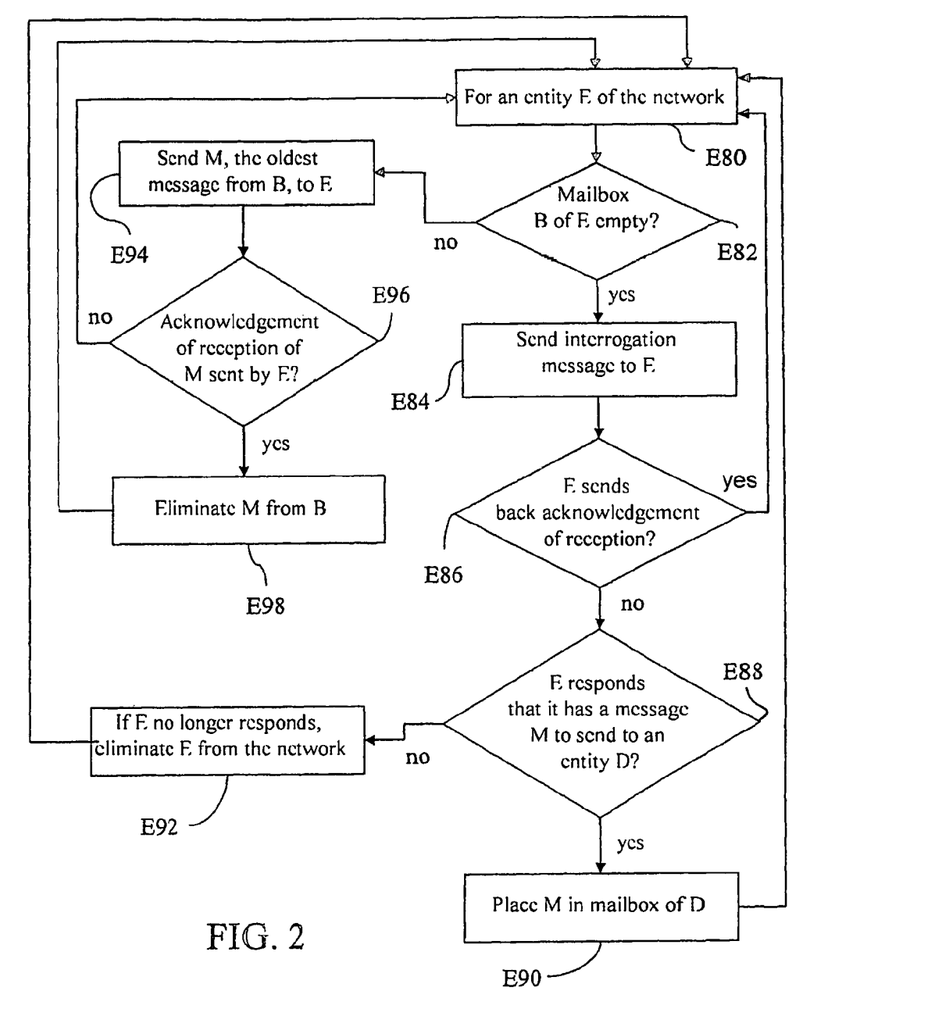
FIG. 2 is a flowchart of the main steps executed upon the implementation of one particular embodiment of the communication method of the present invention.

The FIG. 2 flowchart shows the main steps executed by the LPU 10 on implementing a communication process conforming to the invention.

The LPU 10 scans the list of electronic entities. For each entity E of the network (step E80), the LPU 10 tests whether the mailbox B assigned to the entity E is empty (test E82). If the mailbox B is empty, the LPU 10 sends an interrogation message to the entity E (step E84). The LPU 10 then tests whether the entity E sends back an acknowledgement (test E86). If the entity E sends back an acknowledgement, the LPU 10 effects the same exchange with the next electronic entity (steps E82, E84, E86).

If not, i.e. if the entity E does not send back an acknowledgement, the LPU 10 tests whether the entity E responds that it has a message M to send to an entity D (test E88). If the entity E has a message M for the entity D, the LPU 10 places the message M in the mailbox of the entity D, whereupon the process resumes for the next electronic entity, starting from the test E82.

If, during the test E88, the entity E no longer responds, the LPU 10 eliminates the entity E from the network, after which the process resumes for the next electronic entity, starting from the test E82.

If, during the test E82, the mailbox B of the entity E is not empty, the LPU 10 sends the entity E the oldest message M from the mailbox B (step E94). The LPU 10 then tests if the entity E sends back an acknowledgement of the message M (test E96). If not, the process resumes for the next electronic entity, starting from the test E82. Otherwise, i.e. if the entity E acknowledges receiving the message M, the LPU 10 eliminates the message M from the mailbox B (step E98). In the most usual situation, B is an inbox, but B could instead be an outbox.

Figure 3:
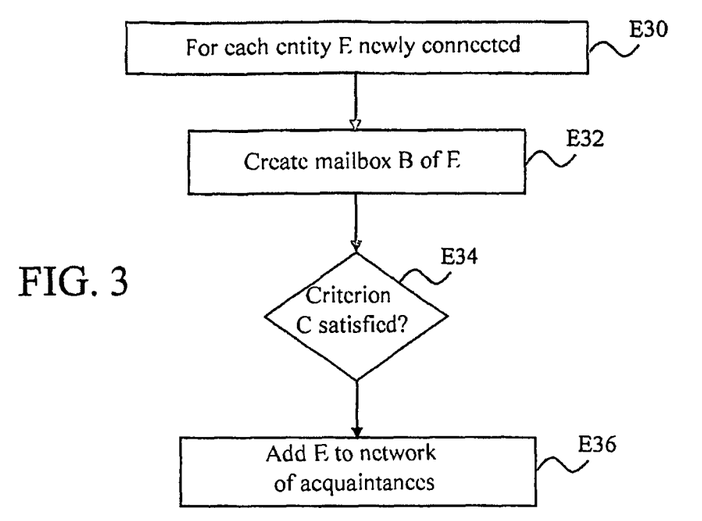
FIG. 3 is a flowchart of the main steps executed upon the arrival of a new electronic entity in the radius of action of one particular embodiment of the communication management unit of the invention.

The FIG. 3 flowchart summarizes the mechanism following the arrival (step E30) of a new electronic entity in the radius of action of the LPU 10. The LPU 10 creates a mailbox B for the entity E (step E32) and then tests whether the criterion C determining the addition of the entity E to the network of acquaintances is satisfied (test E34). If this is the case, the LPU 10 adds the entity E to the network of acquaintances (step E36) and, for each entity already present in the network, registers the entity E as an acquaintance of that entity if and only if the two entities communicate with each other subsequently.

The network of acquaintances may be implemented in different ways. For example, it may take the form of a table of dynamic acquaintances in the memory of the LPU 10, i.e. a table of correspondences associating each electronic entity with its acquaintances. The network of acquaintances may instead be divided between the memories of each of the electronic entities, each of which then knows its own acquaintances.

Diverse variants of and improvements to the embodiment described above may be envisaged.

The LPU may be seen as an electronic entity always connected to the system. It then has its own identifier, service or family code and mailbox for receiving messages from other electronic entities, and is referred to as a "participating LPU".

One of the electronic entities may be accessible indirectly through any open network via a rerouting or proxy system. The LPU may then serve as a proxy for that remote entity.

A time to live (TTL) may be specified for a message awaiting its addressee. This eliminates messages that have become obsolete because their addressee disappeared a long time ago. In certain applications, the parameter TTL may also be set to a special value (for example the value 0) to cancel a message as soon as it is detected that its addressee is out of range of the LPU.

The messages may be assigned a priority P. In this case, the communication mechanism handles the highest priority messages first.

Depending on the intended application, it may be advantageous to use a call offering mechanism: an entity that requires a particular service sends a broadcast message to all the known electronic entities of the system, i.e. to all of the items in the list stored in the LPU. The interested entity or entities can send a proposal to provide the service that the requesting entity can accept or refuse according to its own criteria.

The whole of the call offering mechanism (the broadcast message, the responses and then the acceptance message from the requesting entity) uses the communication method of the invention. At the end of the call offer, the LPU may complete its table of dynamic acquaintances, for example by indicating whether a particular entity knows how to provide this kind of service.

A TTL parameter may be associated with the broadcast message.

If a new entity enters the radius of action of the LPU, a particular broadcast message is broadcast to all the entities already present in the network and indicates in particular the identity of the incomer and its service or family code. This mechanism is known as the "broadcast on incoming" mechanism.

In a similar manner, if an electronic entity leaves the radius of action of the LPU, a particular broadcast message is broadcast to all the entities still present in the network. This message indicates in particular the identifier of the departing entity and its service or family code and this mechanism is known as the "broadcast on outgoing" mechanism.

If a plurality of electronic entities participate in a distributed calculation, it is possible to regard the sending of a message Ml from an entity El to an entity E2 as a calculation request. An explicit calculation continuation entity E3 may be specified in the message. Accordingly, when the entity E2 has finished the calculation effected on reception of the elements of the message Ml, it sends a calculation continuation request by sending a message M2 to the entity E3.

Different examples of the use of the invention are given next.

First of all, in the field of air passenger loyalty, consider a passenger who has a loyalty card for airline X. The passenger purchases a transport ticket from the company X and goes to the VIP lounge to await boarding.

A hostess carries a new generation location terminal capable of using the mechanism of the present invention. She holds a hostess card with a clientele management application.

When the passenger passes near the terminal of the hostess, his loyalty card and ticket declare themselves to the terminal. After appropriate authentication, the hostess card asks the transport ticket for the identity of the passenger and asks the loyalty card for the number of loyalty points associated with that passenger.

If the hostess card detects a loyal customer (having a number of loyalty points exceeding a particular threshold), the hostess offers the passenger his preferred drink, for example, this information being stored in the loyalty card. The hostess card then transfers to the loyalty card a voucher valid in one of the shops of the departure lounge, for example.

By way of a second example, consider a customer having in his wallet a bank card and a loyalty card. In addition to their standard mode of operation, the two cards know how to communicate securely via a contactless interface.

Consider also a merchant having a new generation payment terminal capable of using the mechanism of the present invention.

The customer makes a payment with his bank card by entering his PIN in the usual way, but without having to take his bank card out of his wallet. Once the payment has been validated, the bank card sends a broadcast message to search for a loyalty service for the store in which the purchase has just been effected. The loyalty card proposes its services by specifying that it accepts the task of storing loyalty points in accordance with the request from the bank card.

The bank card then transmits to the loyalty card the number of loyalty points to be credited to the account of the customer, and the loyalty card credits those points.

If the wallet of this customer contains another loyalty card, such as the card of a transport operator, this other card may also ask the bank card the nature of the purchase before proposing its services. The three electronic entities then communicate.

In order to secure the exchanges between these different entities, a fourth electronic entity (SHM type secure electronic entity) may be inserted into the body of the payment terminal and participate in certain authentication operations on behalf of the other three electronic entities.

An example of the application of the invention to personalizing objects is described next. The term "personalization" means the writing of personal data specific to an object in or on the object by mechanical, electronic, optical, chemical or any other means.

Consider a personalization machine comprising a plurality of stations. The object to be personalized is placed for a particular time in front of each station and then moved to the next station. Because the timing of the movement from one station to another is not strictly defined, some messages may be lost during the movement from one station to the next.

Figure 4:
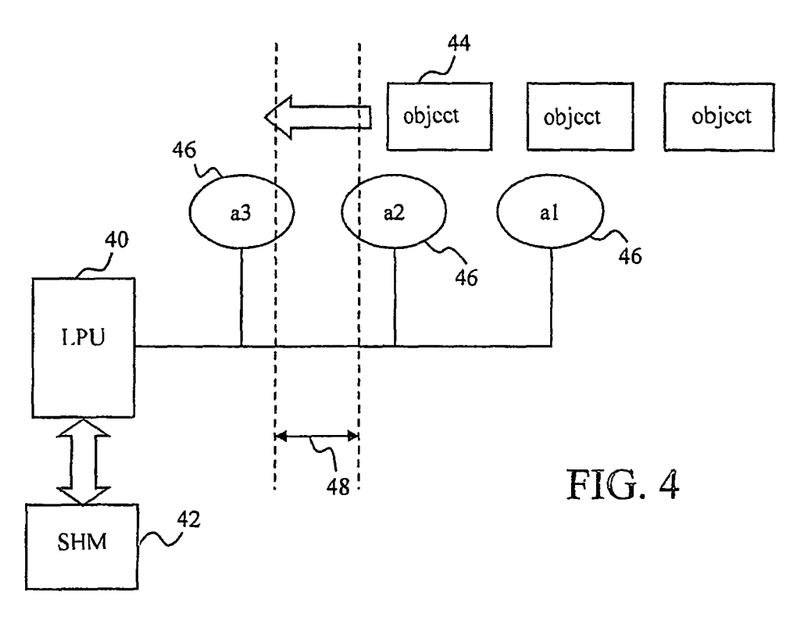
FIG. 4 is a diagram of one particular embodiment of a device of the present invention for personalizing objects.

FIG. 4 shows a device of this kind. An LPU 40 is connected to a security hardware module SHM 42 and to three antennas a1, a2, a3 each designated by the reference number 46. Each of the antennas 46 corresponds to a workstation of a machine for personalizing objects 44 that move from station to station. The SHM 42 contains the necessary personalization information. The arrow 48 in the diagram delimits a "shadow area", which is an area of radio-frequency interference through which the object to be personalized passes between two successive workstations.

Here the invention applies advantageously to the electronic entities consisting of the SHM 42 and the object 44 to be personalized. Thus the object disappears from the list of dynamic acquaintances when it enters the area 48 and then reappears in the list when it is in front of a new workstation.

When the object is in the area 48, current messages are saved in mailboxes according to the invention, as described above. There is therefore continuity of communication between the object 44 and the SHM 42 via the LPU 40 and the different antennas 46.

More generally, the method of the invention provides continuity of communication involving an electronic entity and an antenna from a plurality of antennas connected to a communication management unit if this electronic entity moves in such a manner that the communication involves another antenna from the abovementioned plurality of antennas.

Finally, the present invention may advantageously be used for the secure personalization of an object including a first secure set consisting of a first storage unit and a first microcircuit by a personalization method that employs n−1 secure sets in addition to the first secure set, n being an integer strictly greater than 2, each of the secure sets consisting of a storage unit and a microcircuit and forming with the object an authorized n-tuplet known to at least one of the secure sets, and the personalization method including a plurality of mutual authentication steps of pairs of secure sets, prior to a personalization step consisting in writing personal data specific to this object on or in this object.

One or more of the microcircuits previously cited may be adapted to communicate with the external environment using a contactless technology.

The object to be personalized is a document issued by the state, for example, such as an identity card, a passport, a visa, a vehicle registration document, or any other document of an official nature, such as a notarized document, a transport ticket such as a season ticket for use of public transport, or a travel document, such as a driver's license or a toll ticket or other proof of a right of transit, for example of the type issued by the authorities of Mexico City so that motorists may enter the city.

The n−1 secure sets mentioned above may be taken from:
- a secure set representing a batch of objects to be personalized,
- a secure set including a secure electronic entity associated with a machine adapted to personalize the objects of this batch, and
- a secure set attached to an operator authorized to use the machine.

This enables secure personalization of any object forming part of a batch, such as an identity card taken from an initial batch of cards to be personalized, personalization being effected by means of an approved machine identified by an associated machine secure module, operated by an approved operator identified by an operator microcircuit card in his possession, for example, which identifies him uniquely.

For more details of this personalization method, see French patent application No. 02 15551.

The invention claimed is:

1. A method of communicating between at least two electronic entities having contactless communication means, said method comprising:
   using a communication management unit to control at least part of a process of communication between said electronic entities, said communication management unit (LPU) employing a command-response protocol using said contactless communication means to communicate with said electronic entities upon said electronic entities being within a radius of action of said communication management unit;
   storing in said communication management unit a list of said electronic entities that are within the radius of action of said communication management unit; and
   querying each of the electronic entities to determine if any of the electronic entities has a message to be sent to an other of said electronic entities; and
   for each electronic entity of said list,
      sending an interrogation message from said communication management unit to the electronic entity, in order to determine if the electronic entity has a message to be sent to another of said electronic entities,
      a determination being positive upon receiving, in response to the interrogation message, said message to be sent to said other electronic entity, otherwise said determination being negative,
      where, in the case of a positive determination, storing a received message in a mailbox of said communication management unit that is assigned to said electronic entity or to said other electronic entity, and
      where in the case of a negative determination, if no acknowledgment from the electronic entity is received in response to the interrogation message thereby showing that the electronic entity is no longer within said radius of action, removing the electronic entity from said list of electronic entities,
   wherein, when said list includes a new electronic entity, a mailbox is created in the communication management unit, said mailbox being adapted to receive and store messages sent to or by said new electronic entity.

2. The method according to claim 1, wherein said electronic entities constitute a network of acquaintances.

3. The method according to claim 2, wherein, upon said list including a new electronic entity, the method further comprising a step of adding the new electronic entity to said network of acquaintances as a function of at least one predetermined criterion.

4. The method according to claim 1, wherein each of said electronic entities is associated with a unique identifier.

5. The method according to claim 4, wherein each identifier is associated with a service or family code.

6. The method according to claim 1, wherein at least one of said electronic entities is secure.

7. The method according to claim 1, wherein at least one of said electronic entities is a loyalty card.

8. The method according to claim 1, wherein at least one of said electronic entities is a payment card.

9. The method according to claim 1, wherein the method ensures continuity of communication involving one of said electronic entities and an antenna from a plurality of antennas connected to the communication management means when said electronic entity moves in such a manner that said communication involves another antenna from said plurality of antennas.

10. The method according to claim 1, wherein said list of said electronic entities includes a list of all of said electronic entities separate from a list of said electronic entities in communication with other said electronic entities.

11. The method according to claim 1, wherein one of the electronic entities is a proximity card with a 10 cm range and that complies with ISO/IEC standard 14443, and an other one of the electronic entities is a vicinity card with a 70 cm range and that complies with ISO/IEC standard 15693.

12. The method according to claim 1, wherein at least one of said electronic entities is a contactless microcircuit card.

13. The method according to claim 1,
wherein said electronic entities include said other of the electronic entities and a sender entity, and
wherein said message is sent from the sender entity.

14. The method according to claim 1, further comprising:
upon contacting said other of the electronic entities intended to receive the message, sending the message to said other of the electronic entities.

15. A communication system, comprising:
at least two electronic entities having contactless communication; and
further comprising:
employing a command-response protocol to communicate with said electronic entities using said contactless communication upon said electronic entities being within a radius of action of said communication management unit, said communication management unit having stored therein a list of said electronic entities that are within the radius of action of a communication management unit,
wherein at least one of said electronic entities communicates with said communication management unit using said contactless communication,
wherein said communication management unit is configured to, for each electronic entity of said list,
send an interrogation message to the electronic entity in order to determine if the electronic entity has a message to be sent to another of said electronic entities,
a determination being positive upon receiving, in response to the interrogation message, said message to be sent to said other electronic entity, otherwise said determination being negative,
where, in the case of a positive determination, the communication management unit stores a received message in a mailbox of said communication management unit that is assigned to said electronic entity or to said other electronic entity, and
where in the case of a negative determination, if no acknowledgment from the electronic entity is received in response to the interrogation message thereby showing that the electronic entity is no longer within said radius of action, the communication management unit removes the electronic entity from said list of electronic entities,
and when said list includes a new electronic entity that is configured to exchange messages with at least one of the electronic entities, creating a new mailbox, said new mailbox configured to receive and store messages sent to or by said new electronic entity.

16. The communication system according to claim 15, wherein one of the electronic entities is a proximity card with a 10 cm range and that complies with ISO/IEC standard 14443, and an other one of the electronic entities is a vicinity card with a 70 cm range and that complies with ISO/IEC standard 15693.

17. The communication system according to claim 15, wherein said communication management unit further includes means for sending the message to said addressee entity upon a determination that said addressee entity can be contacted.

\* \* \* \* \*